2,951,864
PREPARATION OF PURE TRIALKYL BORATES

Howard Steinberg, Fullerton, Calif., assignor to United States Borax & Chemical Corporation, Los Angeles, Calif., a corporation of Nevada No Drawing. Filed Oct. 30, 1958, Ser. No. 770,597

7 Claims. (Cl. 260—462)

This invention relates as indicated to a method for producing pure trialkyl borates and has particular reference to a method for producing trialkyl borates wherein the alkyl group is from one to four carbons.

Prior methods for making alkyl borates have involved first making an alkyl borate-alcohol azeotrope and then separating the ester from the alcohol.

The present invention results in the direct preparation of pure alkyl borate ester and completely eliminates the costly and complicated operations of separating the ester from the alcohol which is a result of prior art methods.

It is therefore the principal object of this invention to provide a new method for the direct preparation of pure trialkyl borate esters.

Other objects will appear as the description proceeds.

To the accomplishment of the foregoing and related ends the invention then comprises the features hereinafter fully described and pointed out in the claims, the following description setting forth in detail certain illustrative embodiments of the invention, these being indicative, however, of but a few ways in which the principle of the invention may be employed.

Broadly stated, the present invention comprises the method of producing substantially pure alkyl borate esters which comprises reacting boron trioxide with an alkyl silicate, the alkyl group of said silicate having from one to four carbon atoms.

The present invention can be illustrated by the following equation:

$$2B_2O_3 + 3Si(OCH_3)_4 \rightarrow 4B(OCH_3)_3 + 3SiO_2$$

This reaction works equally well with any silicate having an alkyl group of from 1-4 carbons. Since the present reaction does not result in any alcohol or water which would tend to interfere with the purity of the alkyl borate ester, excess amounts of either or both of the reactants would not be harmful. Thus while from an economic standpoint stoichiometric quantities of the reactants are desirable, an excess of either one or both of the ingredients would not hinder the production of the pure ester.

So that the present invention can be more clearly understood, the following illustrative examples are given:

I

To a 300-ml. three-necked flask equipped with a stirrer and reflux condenser were added 6.1 parts of boric oxide, 20 parts of methyl silicate and 150 ml. of xylene. The flask was heated to the reflux temperature of the xylene (about 140° C.) and the refluxing was continued for about eight hours. The condenser was then replaced with a packed column carrying a variable takeoff stillhead and substantially pure methyl borate was distilled at a head temperature of 68.5° C. The product on analysis showed a boron content of 10.50% (theory=10.41% B).

II

To the apparatus of Example I was added 6.1 parts of boric oxide, 27 parts of ethyl silicates, and 150 ml. of toluene. The mixture was refluxed for about six hours and substantially pure ethyl borate was distilled at a head temperature of about 119° C.

III

Using the apparatus of Example I, 6.1 parts of boric oxide and 35 parts of isopropyl silicate were added to 175 ml. of xylene. The resultant product was substantially pure isopropyl borate.

IV

Example III was repeated using normal propyl silicate and the resultant product was substantially pure normal propyl borate.

V

Using the apparatus of Example I, 6.1 parts of boric oxide and 42 parts of tertiary butyl silicate were added to 175 ml. of xylene. The resultant product was substantially pure tertiary butyl borate.

It is to be clearly understood that the solvent used in the present method has no effect on the reaction and any of the well-known solvents which are inert to boric oxide and the alkyl silicates can be used. Thus such solvents as benzene, toluene, xylene, decane, etc., are all equally applicable to the present process.

Other modes of applying the principle of the invention may be employed, provided the features stated in any of the following claims or the equivalent of such be employed.

I, therefore, particularly point out and claim as my invention:

1. The method of producing substantially pure alkyl borate esters which comprises reacting boron trioxide with an alkyl silicate, the alkyl group of said silicate having from one to four carbon atoms.

2. The method of producing substantially pure alkyl borate esters which comprises refluxing boron oxide and an alkyl silicate in an inert solvent, the alkyl group of said silicate having from one to four carbon atoms and distilling substantially pure alkyl borate ester.

3. The method of producing substantially pure methyl borate which comprises reacting boron oxide and methyl silicate.

4. The method of producing substantially pure ethyl borate which comprises reacting boron oxide and ethyl silicate.

5. The method of producing substantially pure isopropyl borate which comprises reacting boron oxide and isopropyl silicate.

6. The method of producing substantially pure normal propyl borate which comprises reacting boron oxide and normal propyl silicate.

7. The method of producing substantially pure tertiary butyl borate which comprises reacting boron oxide and tertiary butyl silicate.

No references cited.